United States Patent
Golembiewski et al.

(10) Patent No.: US 6,199,889 B1
(45) Date of Patent: *Mar. 13, 2001

(54) REDUCED WEIGHT FIFTH WHEEL ASSEMBLY

(75) Inventors: Ronald D. Golembiewski, Chicago; V. Terrey Hawthorne, Lisle; John W. Kaim, Chicago; Jeffrey M. Ruback, Edwardsville, all of IL (US)

(73) Assignee: Amsted Industries Incorporated, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/167,649

(22) Filed: Oct. 6, 1998

Related U.S. Application Data (63) Continuation-in-part of application No. 08/771,106, filed on Dec. 20, 1996, now Pat. No. 5,865,458.

(51) Int. Cl.⁷ .................................................. B62D 53/08
(52) U.S. Cl. ............................................ 280/433; 280/437
(58) Field of Search .................................. 280/433, 434, 280/435, 437, 438.1

(56) References Cited

U.S. PATENT DOCUMENTS

| | | | |
|---|---|---|---|
| 2,581,254 | 1/1952 | Greenawalt | 280/33.05 |
| 2,621,056 | 12/1952 | Kayler | 28/33.05 |
| 2,640,707 | 6/1953 | Kayler | 280/33.05 |
| 2,648,544 | 8/1953 | Kayler | 280/33.05 |
| 2,861,818 | 11/1958 | Kayler et al. | 280/434 |
| 3,013,815 | 12/1961 | Geerds | 280/435 |
| 3,484,124 | * 12/1969 | Wille | 280/434 |
| 3,578,357 | 5/1971 | Bouman | 280/434 |
| 3,640,549 | 2/1972 | Neff et al. | 280/435 |
| 3,813,114 | 5/1974 | Berends | 280/434 |
| 4,208,062 | 6/1980 | Maassen | 280/434 |
| 4,221,397 | 9/1980 | Holt | 280/436 |
| 4,333,666 | 6/1982 | Hammonds | 280/435 |
| 4,477,100 | 10/1984 | Elyakim | 280/434 |
| 4,659,101 | 4/1987 | Buckley | 280/434 |
| 4,871,182 | * 10/1989 | Altherr et al. | 280/434 |
| 4,946,183 | 8/1990 | Benson et al. | 280/434 |
| 5,865,458 | * 2/1999 | Golembiewski et al. | 280/434 |

* cited by examiner

*Primary Examiner*—Brian L. Johnson
*Assistant Examiner*—Avraham H. Lerner
(74) *Attorney, Agent, or Firm*—Edward J. Brosius; Stephen J. Manich (57) ABSTRACT

A reduced weight fifth wheel generally mountable on a tractor for coupling between a tractor and a trailer, which fifth wheel has the approximately the same bearing surface area, a more continuous surface area by elimination of a lever-bar pin port in the bearing surface, thinner support ribs and smaller fillets, a shorter longitudinal length with a wider kingpin receiving slot for receipt of a trailer kingpin, with a locking-jaw mechanism having a redesigned lever-bar pin and pin-receiving port to enable reduction of the weight and to enhance production casting practices, which fifth wheel further encompasses lateral support ribs at the plate outer perimeter and rearward of the mounting brackets to define support pockets ahead of the engaging ramps to avoid lateral deflection and deformation of the plate at vertical loading.

3 Claims, 8 Drawing Sheets

REDUCED WEIGHT FIFTH WHEEL ASSEMBLY

The present application is a continuation-in-part of application U.S. Ser. No. 08/771,106 filed on Dec. 20, 1996, now U.S. Pat. No. 5,865,458.

BACKGROUND OF THE INVENTION

The present invention relates to fifth wheel assemblies generally utilized for tractor-trailer combinations. More specifically, the present invention relates to a fifth-wheel bearing plate with a reduced weight structure providing equivalent bearing plate surface areas to prior similar fifth wheel bearing-plate surfaces from the present applicant for contact with trailer wear plates. However, the bearing plate is shorter in overall length, includes a more ovate shape, wider kingpin receiving slot, a more continuous upper surface, has thinner support ribs and fillets to improve casting practice and lower production costs as well as the weight of the bearing plate.

Fifth wheel assemblies on tractors broadly encompass a bearing plate, a coupling mechanism with trailer kingpin guide means, mounting brackets for mating the assembly with the tractor, a jaw-release handle and a locking jaw. The locking jaw is opened to receive and retain a mating kingpin extending from a trailer with a wear plate. After mating of the kingpin and fifth wheel jaw, the jaw mechanism locks to secure the kingpin, and thus the trailer, to the fifth wheel. The trailer wear plate bears against the bearing plate planar surface, which contacting surfaces suffer wear during turning or pivoting. In addition, the fifth wheel jaw must be adjusted, as in present practice, for the kingpin or there will be a resultant slack in the jaw.

Fifth wheel assemblies are predominantly utilized on commercial or revenue-generating tractors, although notice is taken of their usage on a limited number of recreational trailer applications. The fifth wheel structures are broadly divided by their weight carrying capacity. As over-the-road tractors generally are susceptible to state imposed weight limitations in their carrying capacity, there is an ongoing effort in the industry to reduce the tractor gross vehicle weight and thus to increase the payload capacity of the tractor-trailer arrangements or increase fuel economy.

Reduction in fifth-wheel weight cannot preclude safety and load bearing considerations, which are related to the fifth-wheel physical parameters. The particular style, shape or construction of the fifth wheel may be dependent upon the manufacturer. However, the fifth-wheel performance characteristics and apparatus will include the ability to couple with a kingpin, the strength to bear typical highway service loads, which include longitudinal (both buff and draft) loads, vertical loads, transverse loads and overturning (roll) loads, a locking jaw capable of retaining the kingpin and trailer coupled, and a jaw unlocking mechanism for disengagement of the kingpin and trailer.

Efforts have been made to reduce the weight of the fifth wheel, especially on flatbed railcars for piggyback transport, by casting the fifth wheel plate of aluminum for lightweight construction. However, the cast aluminum fifth wheels did not have sufficient physical strength to withstand the stresses normally encountered by fifth wheels. Thus, fifth wheel hitches continue to be primarily manufactured of cast steel or formed structural steel. As noted in U.S. Pat. No. 4,659,101 to Buckley, the weight of the fifth-wheels is not only a drawback on collapsible railroad flatbed stanchions but the fifth wheel weight is a considerable addition to the weight of a conventional truck tractor. This Buckley—'101 patent teaches a forged aluminum bearing plate and depending abutments for the locking jaws. A forged aluminum fifth wheel provides the strength necessary to withstand the normal tractor-trailer service stresses. However, it is known that forged fifth-wheel products are considerably more expensive to produce than are cast fifth-wheel products. This fifth-wheel hitch taught in the Buckley—'101 patent may also be manufactured by steel casting or steel fabrication. Although the focus of this Buckley—'101 patent is primarily directed to the locking jaw mechanism, the disclosure also discusses the concept of mass reduction and the benefits therefrom for a fifth wheel assembly.

U.S. Pat. No. 4,221,397 to Holt teaches a trailer hitch head with jaws to bear all kingpin wear. However, the illustrated top or bearing plate is shown with a generally rectangular configuration demonstrating that bearing plate shape is not limited to an oval, elliptical or circular shape. One of the problems to be overcome with any of the disclosed fifth-wheel structures is excessive top plate wear and avoidance of this wear reduces repair, renovation or replacement of the top plate and trailer wear plate prior to their expected life cycle. The Holt—'397 disclosure alludes to flatcar service, but the teaching of the fifth wheel structure is not limited to such flatcar service.

A second aluminum fifth wheel structure is shown in U.S. Pat. No. 4,208,062 to Maassen, and this fifth-wheel structure is fabricated to be a high-strength, low-weight assembly. However, it is implied in the description that the top bearing plate and the bottom plate are cast aluminum with vertical frames, which top and bottom plates are subsequently bolted together to reduce the total mass of the assembly. The total weight of a given assembly or a percentage reduction in weight is not noted in the disclosure.

Other illustrations of fifth wheel shapes, locking mechanisms and mounting apparatus are shown in the following U.S. Pat. Nos.: 2,621,056; 2,640,707; 2,648,544; 4,946,183; 4,477,100; 4,333,666; 3,813,114; 3,578,357; 3,013,815; 3,640,549; 2,861,818; and 2,581,254. All of these patented apparatus are cast or formed steel and iron components, which iron-based structures have an inherent weight problem related to the physical weight to strength relationship of the material. That is, the density of the iron is relatively large, thus, manufacture of a component with a fixed surface area and thickness requisite for a specified strength characteristic results in a heavy structure. The mass of a fifth-wheel necessary to carry both the static vertical load and the trailing load adds to the gross vehicle weight and consequently reduces the payload carrying capacity or the fuel economy of the tractor-trailer combination. Therefore, it is an ongoing effort to reduce the mass of the fifth wheel while maintaining its strength and load-bearing capacity.

SUMMARY OF THE INVENTION

A reduced weight fifth wheel for tractors with the maximum allowable weight-bearing capacity for the highway systems in the United States is provided in the present invention. This fifth wheel structure, relative to its predecessors, reduced the center recess area, shortened the longitudinal length, widened the outer ramp where the slope of the ramp begins, widened the kingpin receiving groove, shortened the grease groove as the ramp tips were shortened, narrowed the support ribs and reduced the fillets, while maintaining the bearing plate surface contact area requisite for the load-bearing capacity. Maintaining the bearing-plate surface area permits reduced wear between the bearing plate and the trailer wear plate in a lighter fifth wheel. Adequate fifth-wheel, load-bearing strength is maintained in the disclosed structure, as is the provision for communication of grease to the plate surface, while the weight of the fifth wheel assembly is reduced by about twenty percent from its previous design weight. Thus, the fifth wheel is provided with a wider ramping area for receipt of the trailer kingpin and wear plate, and the kingpin receiving groove has been widened to provide a larger target area for the kingpin, which will assist the tractor driver in the coupling of the tractor with the trailer kingpin. Along with the reduction in the fifth-wheel weight, the present lever-bar-pin access hole in the extant fifth-wheel bearing plate surface has been eliminated from the bearing plate, which provides economic manufacturing improvements by reducing the raw material and labor costs.

BRIEF DESCRIPTION OF THE DRAWING

In the figures of the Drawing, like reference numerals identify line components, and in the drawing.

DETAILED DESCRIPTION OF THE PREFERRED EMBODIMENT

Figure 1:
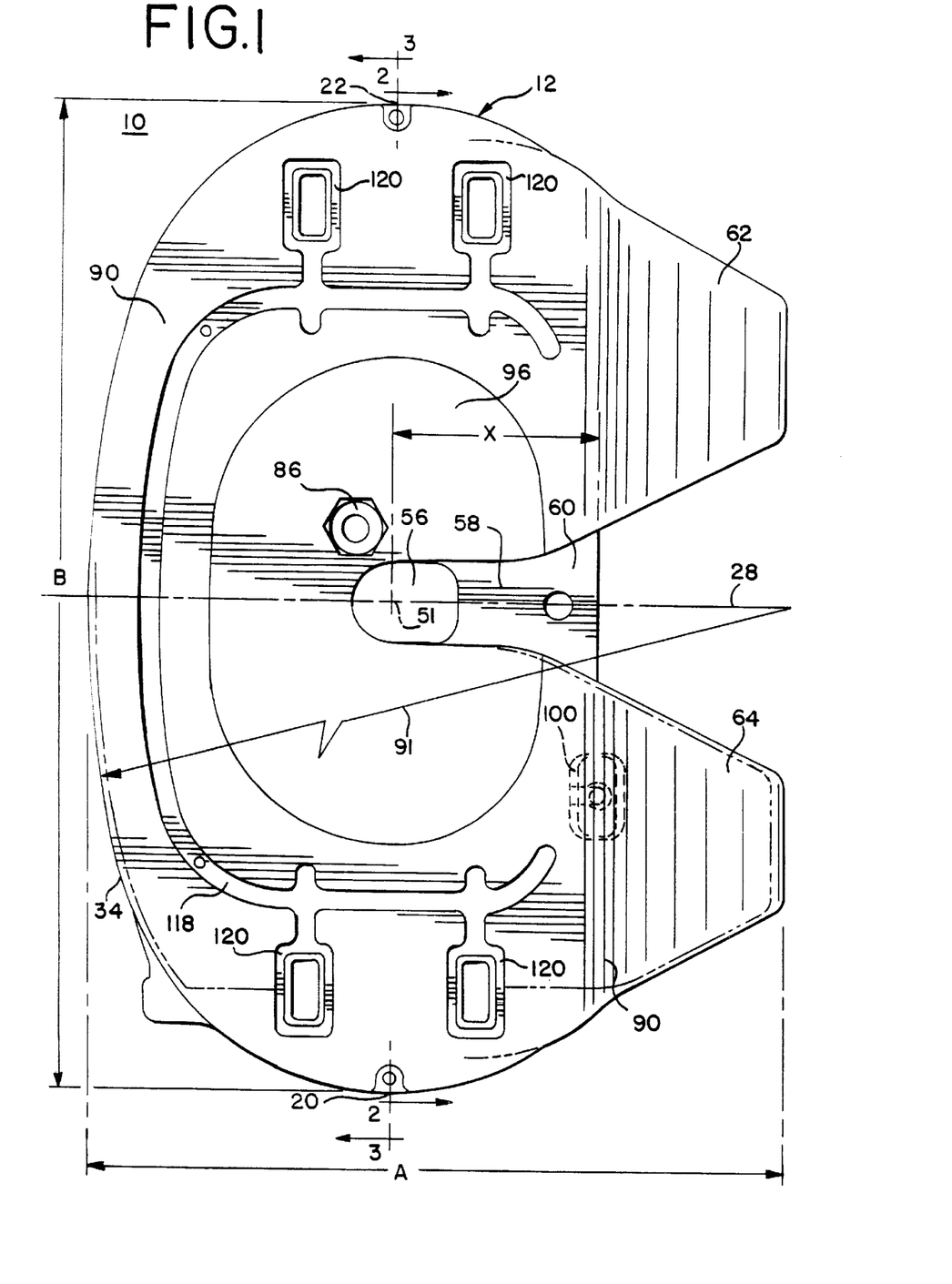
FIG. 1 is a plan view of a fifth wheel assembly.
Figure 2:
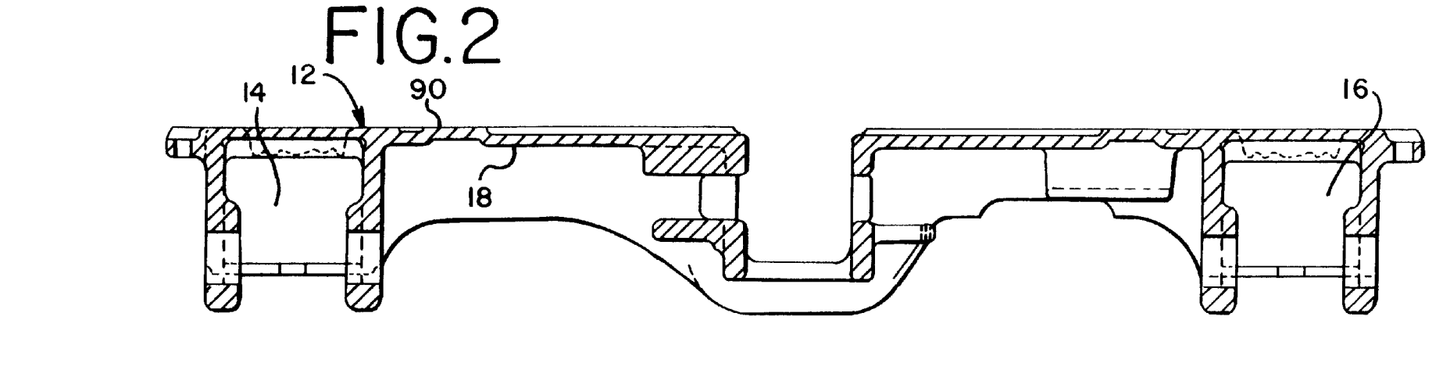
FIG. 2 is an elevational view in cross-section taken along the line 2—2 in FIG. 1.
Figure 3:
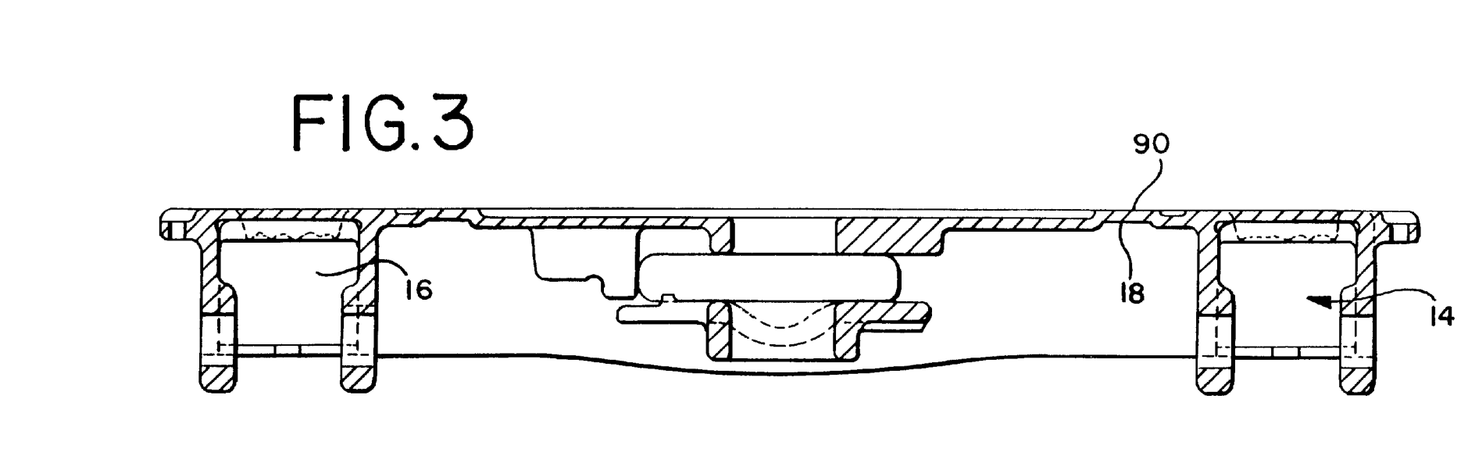
FIG. 3 is an elevational view in cross-section taken along the line 3—3 in FIG. 1.
Figure 9:
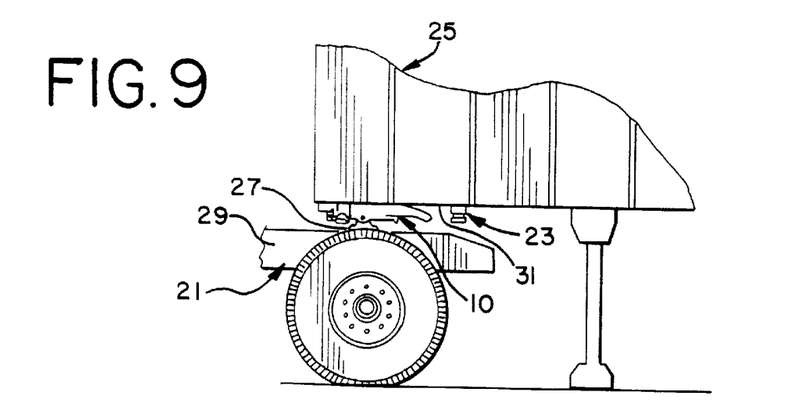
FIG. 9 is an elevational view of the mating ends of a trailer and a tractor during coupling.

A fifth wheel assembly 10, and more specifically top bearing plate 12, is shown in plan view in FIG. 1. Assembly 10 in FIG. 9 is generally mounted on tractor 21 for mating with kingpin 23 of trailer 25, which provides a tandem arrangement for over-the-road transport of goods. In addition, fifth wheel assemblies 10 are utilized on stanchions of flatbed railcars for transport of trailer assemblies and also have been utilized for towing recreational vehicles. However, the predominant use of fifth wheels 10 is as a coupling apparatus on tractors 21 for towing cargo bearing trailers 23.

Figure 4:
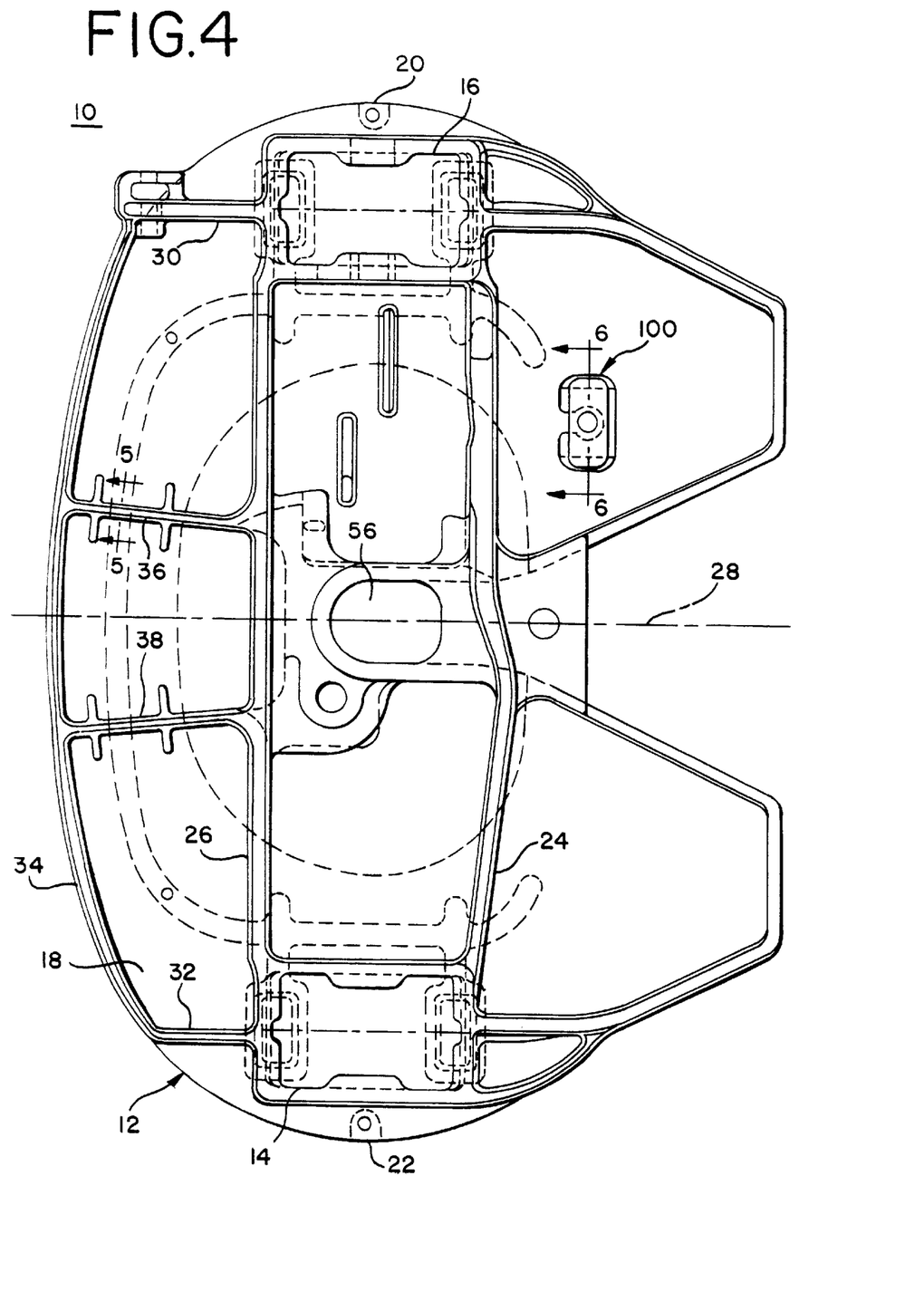
FIG. 4 is a bottom plan view of the fifth wheel assembly in FIG. 1.

Assembly 10 has pivot bracket pockets 14 and 16 on top plate under-surface 18, which pivot bracket pockets 14,16 are shown in FIGS. 2,3,4 and 7, on diametrically opposed sides 20 and 22 of plate 12. Pivot bracket pockets 14 and 16 are matable with tractor mounting brackets 27 on tractor frame 29 in FIG. 9, and bracket pockets 14 and 16 are secured thereto by a pin extending through port 15 and matable with ports in mounting brackets 27 for pivoting of plate 10. In FIG. 4, transverse cross-ribs 24 and 26, which are transverse to longitudinal axis 28, extend between bracket pockets 14 and 16 along under-surface 18. Bracket pockets 14 and 16 are generally parallel to each other, and to longitudinal axis 28. Support ribs 30 and 32 in FIG. 4 generally extend longitudinally forward and parallel to axis 28, from bracket pockets 14 and 16, respectively, to forward rim 34 of top plate 12. Similarly, support ribs 36 and 38 longitudinally extend from transverse cross-rib 26, which is forward of jaw opening 56, forward to rim 34 on either side transverse of longitudinal axis 28.

Figure 8:
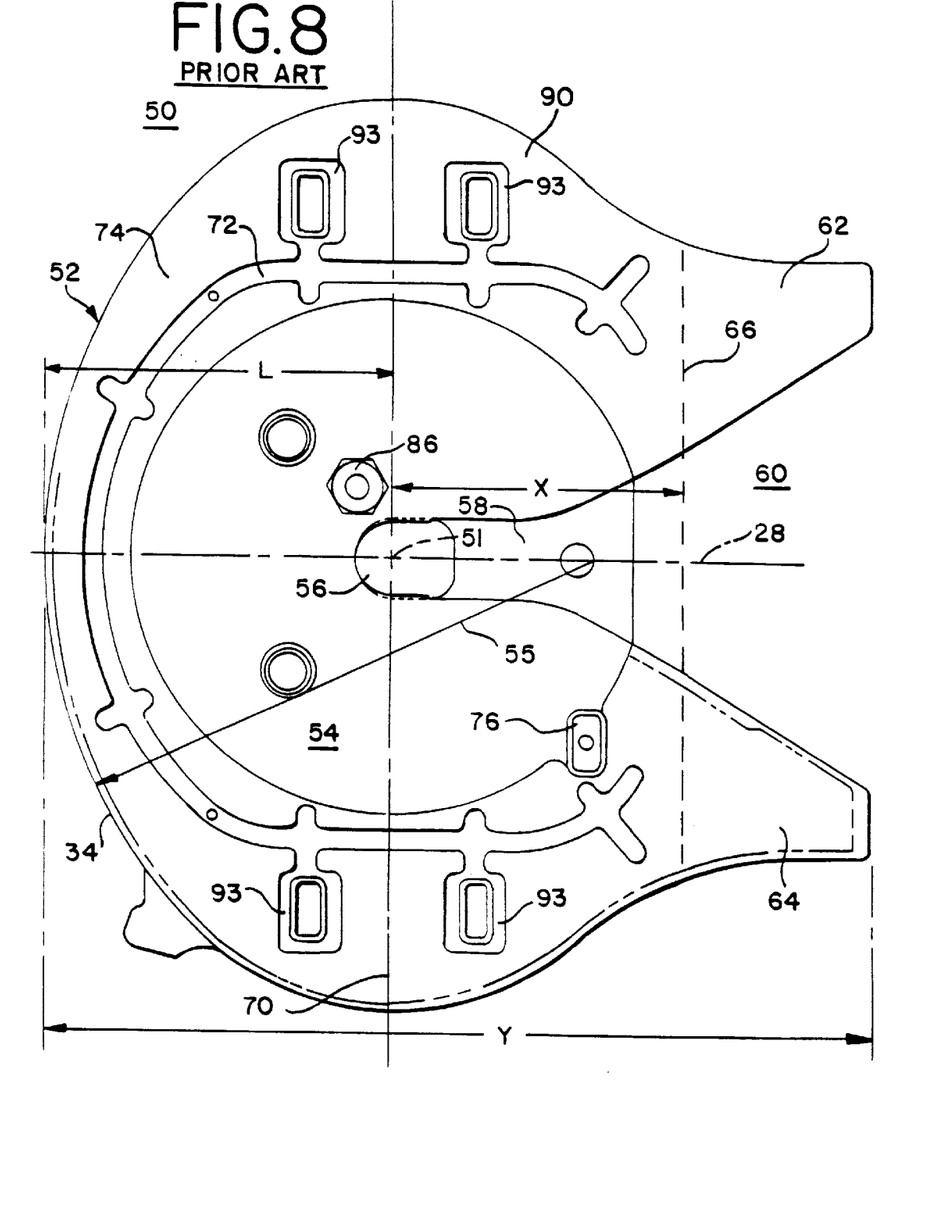
FIG. 8 is a plan view of a prior art fifth wheel assembly.

As shown in FIG. 8, prior art fifth wheel 50 has a generally ovate top plate 52 with a forward longitudinal arc surface having a first arc radius 55 smaller than the arc radius of forward rim 34 of fifth wheel 10. Longitudinal axis 28 and transverse axis 70 in FIG. 8 intersect at radius center point 51 of kingpin throat or jaw opening 56. In this prior fifth wheel configuration, inner recess area 54 is approximately a complete circle with centrally positioned locking jaw opening 56 for mating with kingpin 23. Slot 58 extends between opening 56 and vee-groove 60, which groove 60 is provided between first ramp 62 and second ramp 64. Ramps 62 and 64 downwardly slope from the plane of top plate 52, and begin to slope down from a reference line 66 in FIG. 8. Plate transverse axis 70 is about parallel to and forwardly displaced from line 66 at a distance 'X' in FIG. 8, which is about one-third of the overall length 'Y' of fifth wheel 50. Grease grooves 72 are provided on plate or bearing face 74, which grooves 72 generally surround recess 54. Grooves 72 provide a method for transfer of grease to lubricate surface 74 and thus to reduce wear with a contacting trailer wear plate 31 on the lower surface of trailer 25 in FIG. 9.

Figure 10:
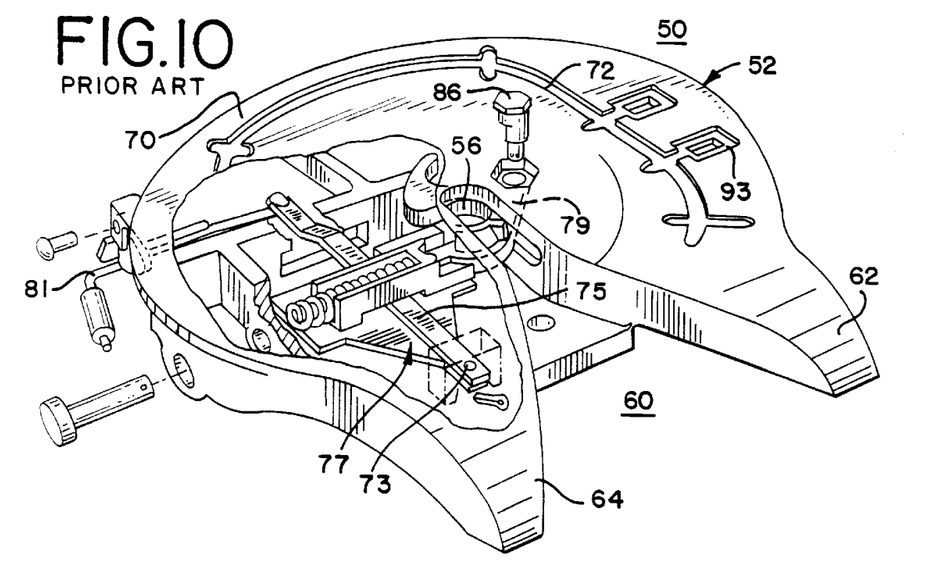
FIG. 10 is a partially exploded, oblique sectional view of a fifth wheel and its locking mechanism; and, FIG. 11 is an enlarged and upright elevational view in partial section of the button-shaped pin and port of FIG. 6.
Figure 11:
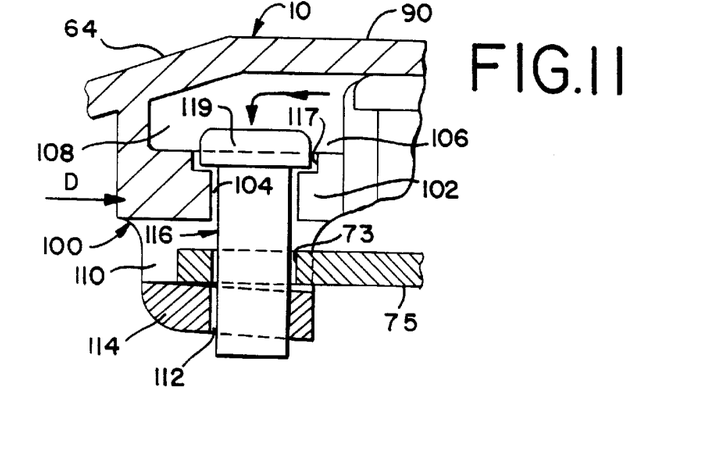

Lever-bar, pin hole or passage 76 in plate bearing surface 74 of fifth-wheel top plate 52 provides access to lower or under surface 18 of plate 52 and to lever-bar pin 73 for lever bar 75 of locking mechanism 77 in FIG. 10. Passage 76 is requisite for maintenance of a lever-bar pin in pin port 73 beneath extant fifth wheel 50, which lever-bar pin would otherwise be inaccessible except by removal of fifth wheel 50 from tractor mounting brackets 27.

Figure 5:
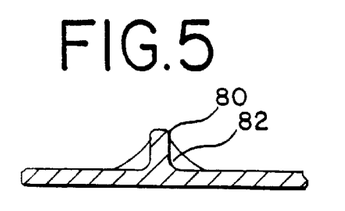
FIG. 5 is a sectional view of a support rib taken along the line 5—5 in FIG. 4.

The mass and large dimensions of extant fifth wheels 50 have required larger support ribs and fillets for added strength than support ribs 80 and fillets 82 of fifth wheel 10, which are illustrated in FIG. 5, as well as a larger recess area 54. These previous support ribs and fillets were usually developed to provide an excess of load-bearing strength based upon historical experience or empirical data and to avoid manufacturing problems, such as hot tears. Both extant fifth wheel 50 and the present invention include jaw pins 86, locking mechanisms 77, operating rods 81 for locking jaws 79 and related components.

In the present invention shown in FIG. 1, bearing or upper plate surface 90 has about the same width B and total surface area as upper surface 74 of extant fifth wheel 50. However, longitudinal length A is approximately 7.4 inches shorter in length for an equivalent fifth wheel used on DOT Class-8 tractors. It is noted that fifth wheels are provided in different sizes based upon their intended service use. Maintenance of the bearing area requirement for the load bearing characteristics of fifth wheel 10 while significantly reducing the length and weight of extant fifth wheel 50 is accommodated by selectively increasing the ovate shape of the plate plan view, increasing the radius of curvature 91 of front edge 34 of fifth wheel 10, reducing the surface area of inner recess 96. The contact area of upper surface 90 has been increased by eliminating lever-bar, pin port 76, which is provided in fifth-wheel 50 of FIG. 8, and thereby providing a smooth transition surface for trailer kingpin 23 to smoothly slide without snagging and causing damage to either trailer 25 or tractor 21.

Figure 6:
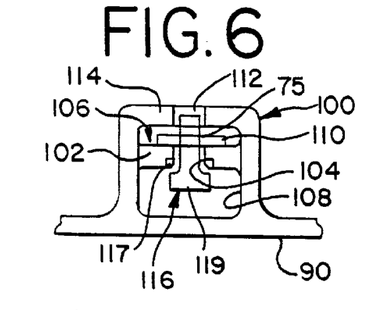
FIG. 6 is a sectional view of the lever-bar pin bracket taken along the line 6—6 in FIG. 4.
Figure 6A:
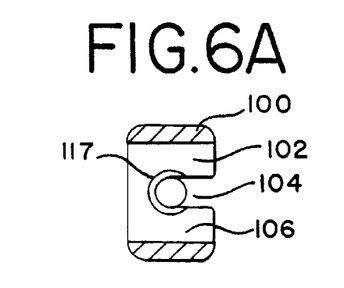
FIG. 6A is a cross-sectional plan view of the lever-bar pin bracket in FIG. 6.
Figure 6B:
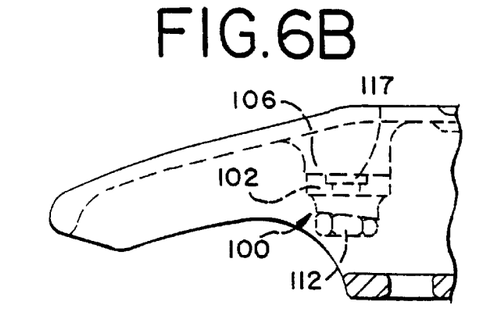
FIG. 6B is a cross-sectional view of one of the fifth-wheel end ramps with the lever-bar pin bracket in phantom outline.

Removal of the lever-bar pin in fifth wheel 10 is accommodated by utilization of portal 100 on undersurface 18 of fifth wheel 10, which is noted in FIGS. 4, 6, 6A, 6B, 11 and in outline in FIG. 1. In FIG. 6, portal 100 is in the inverted position with fifth wheel upper surface 90 at the bottom of the figure, however, this is merely provided for illustration. Plate 102 with gap 104 is positioned in passage 106 of portal 100 and is generally parallel to surface 90, which position of plate 102 creates first subpassage 108 and second subpassage 110. Port 112 in lower wall 114 provides access to lever bar 75 to release button-shaped, lever-bar pin 116 in passage 106, as noted in FIG. 11. In FIG. 6A, gap 104 provides access for lever-bar pin 116. Pin 116 slides rearward to mate with lever-bar port and port 112 in lower wall 114. The button-shaped pin head 119 is longitudinally constrained by recess 117. Port 112 and button-shaped pin 116 are shown in an enlarged and upright view in FIG. 11. Recess 117 in portal 100 is operable to nest the head of the lever-bar pin and to secure it against longitudinal movement.

Grease groove 118 and its related side pockets 120, which are similar to grease groove 72 and its grease pockets 93 in fifth wheel 50, as well as jaw pin 86, are also found in upper surface 90 of fifth wheel 10.

Front length 'L' of fifth wheel 50 in FIG. 8 is measured from radius center point 51 of kingpin throat 56, which length 'L' is noted in this figure. Reduction of front length 'L' of fifth wheel 50 allows a reduction in the thickness of ribs 80 and fillets 82 on the underside of fifth wheel 10, which reductions in length and thickness reduce the weight of fifth wheel 10. In addition, rear length 'X' of fifth wheel 50 in FIG. 8 is measured from radius center point 51 of kingpin throat 56, and a reduction of length 'X' also contributes to the reduction in the weight of fifth wheel 10. The overall weight reduction of fifth wheel 10 is approximately twelve and one-half (12.5%) percent less than the weight of an extant fifth wheel 50.

The primary improvement and benefit of fifth wheel 10 over extant fifth wheel 50 is the total reduction in the weight of fifth-wheel 10 while maintaining the present load-bearing capacity, which weight reduction permits larger revenue load carriage, and a reduction in cost of raw materials, without sacrificing any measure of safety in operating conditions. The underside lever-bar 75 and lever-bar pin 116 arrangement removed the necessity for casting pin-access port 76 through bearing plate 12, thus avoiding the discontinuity in plate surface 90 as well as the necessity for providing access-port inserts into the manufacturing casting mold or dye. This latter feature further eliminated multiple casting cores utilized in the prior production methods. There has been no loss in the ability to lubricate surface 90, as grease groove 72 with its grease pockets 93 has been reconfigured as groove 118 with grease pockets 120 to the planar arrangement of bearing surface 90. Finally, fifth wheel 10 has utilized the available space provided by inner recess area 54 without jeopardizing safety or load-bearing parameters for fifth-wheels 10.

Fifth wheels and fifth wheel assemblies 10 are further known to utilize pocket-like structures in proximity to their mounting brackets and ramps. However, in a known case the pocket structure provides only minimal support against deformation and is primarily intended to inhibit ramp tipping or tilting during the coupling of the fifth wheel to a trailer. In a second structure, the pocket-like structure is, or serves as, the outer perimeter of the fifth wheel and adds only nominal, if any, apparent reinforcement to the plate and ramp structure. This latter structure extends from the backside of the mounting bracket and intersects the outer extremity of the transverse rib with the nominal, if any, apparent support to or interaction with the ramp.

Figure 4A:
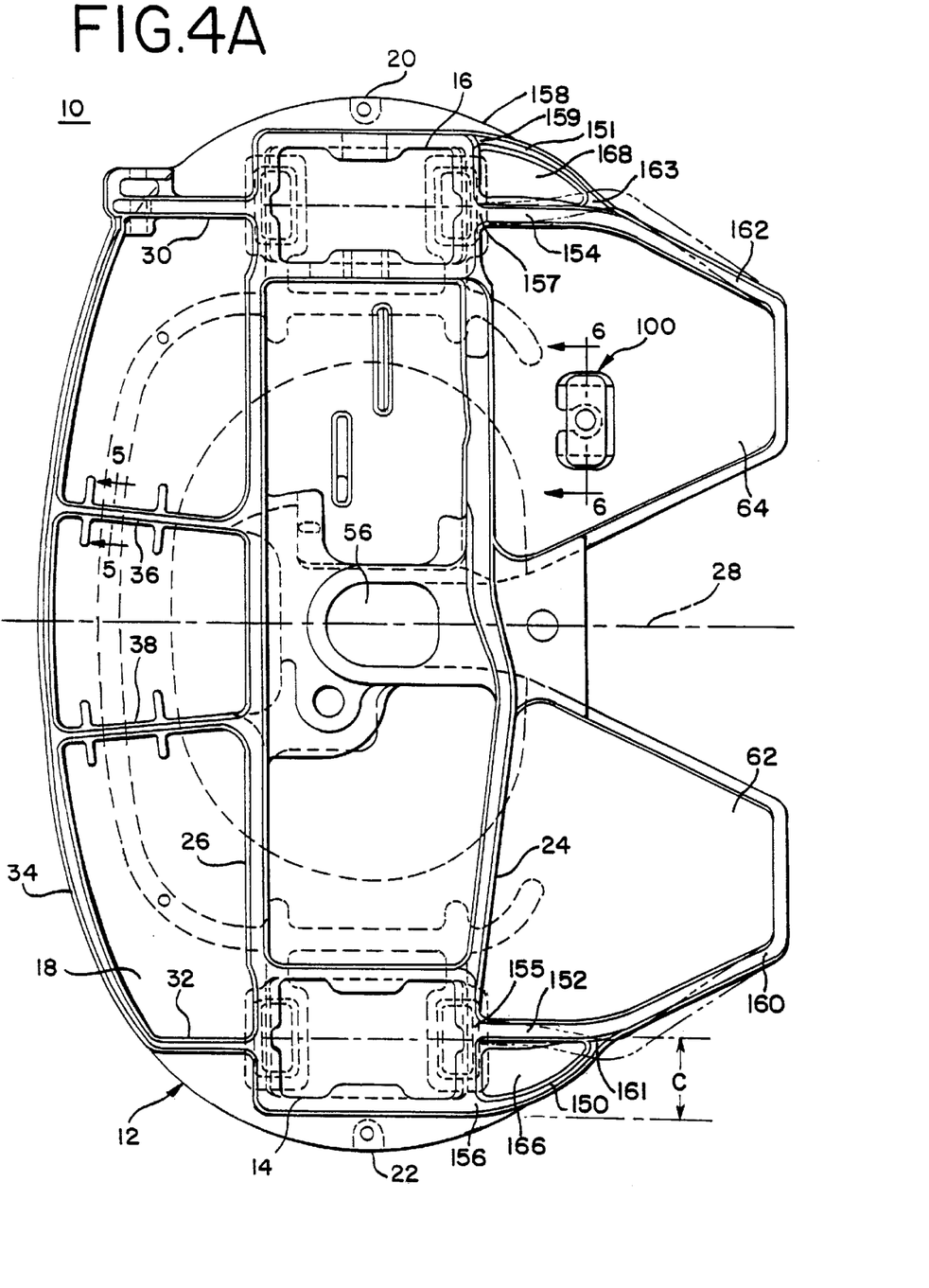
FIG. 4A is a bottom plan view of the fifth wheel assembly in FIG. 4 noting the potential deformation of a load bearing fifth wheel.
Figure 8A:
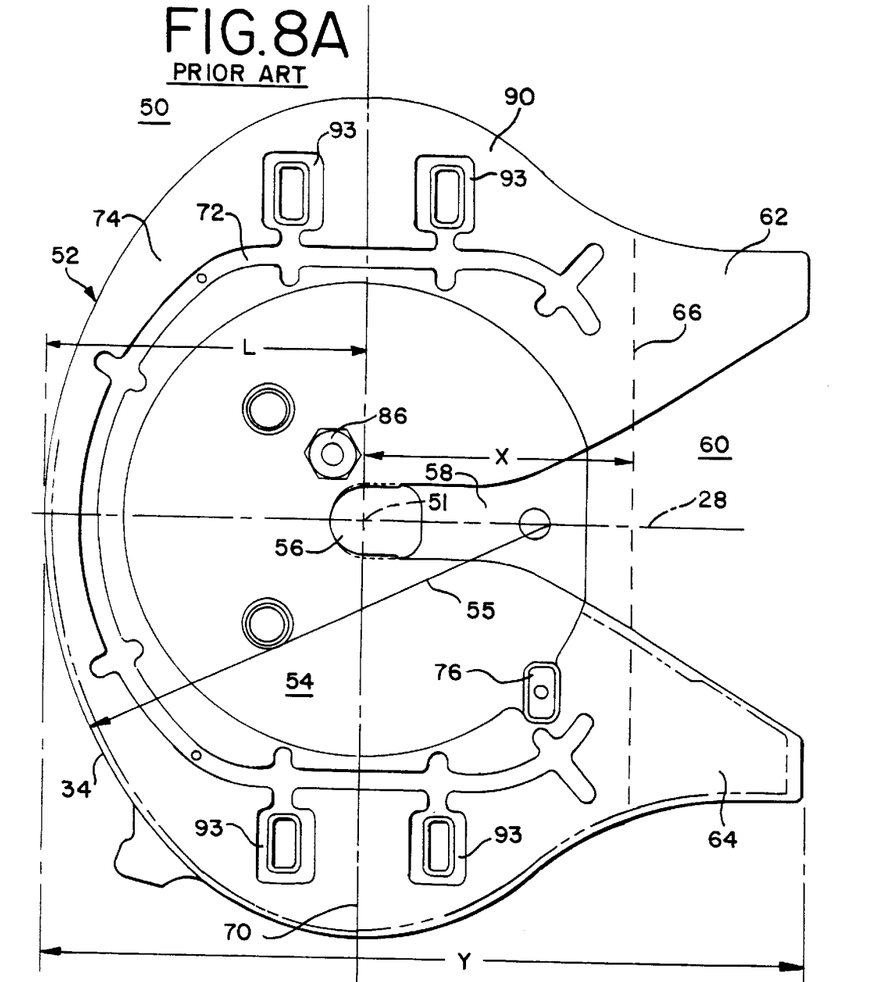
FIG. 8A is a plan view of a prior art fifth wheel assembly with the potential deformation from a vertical load.

In fifth wheel assembly 50 of FIGS. 4A and 8A, the effect of a vertical load, and more specifically the effect of vertical loading, on fifth wheel 50 during coupling to a trailer is reflected in the dashed outline of projected deformation at the merger of ramps 62 and 64 with plate upper surface 90. The referenced vertical loading induces a deflection or deformation of plate 12 as illustrated in FIG. 8A, which deformation may be characterized as a bowing effect approximately at the intersection of ramps 62 and 64 with plate 12. More specifically, the bowing occurs at the outer perimeter 158 of plate 12. This bowing or deflection has been an accepted effect in fifth wheels and fifth wheel assemblies 10, however, it is not a desirable effect and may be a source of damage or requisite early maintenance of fifth wheel plate 12.

In FIG. 4A, reinforcing ribs 150 and 151 are noted along perimeter 158 of fifth wheel 50 and blend in with perimeter 158 at mergers 156, 159 between mounting brackets 14 and 16 and ramps 62 and 64, respectively. Longitudinal support ribs 152 and 154 respectively extend from the intersections 155, 157 of transverse rib 24 with pivot bracket pockets 14 and 16, and are displaced from outer plate perimeter 158 a predetermined distance 'c'. Ribs 152, 154 tangentially blend with outer perimeters 160 and 162 of ramps 62 and 64, respectively. As noted in FIG. 4A, ribs 24, 150 and 152 cooperate to provide first deflection pocket 166 rearward of pivot bracket pocket 14. Similarly ribs 24, 151 and 154 cooperate to provide second deflection pocket 168 rearward of pivot bracket pocket 16.

Figure 7:
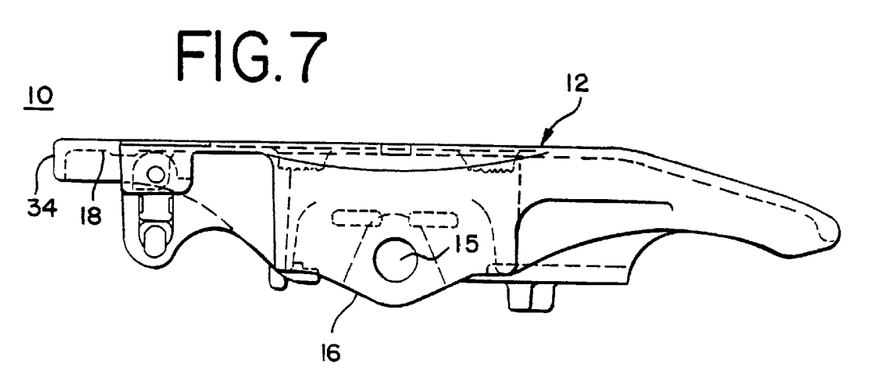
FIG. 7 is a side elevational view of the fifth wheel assembly in FIG. 1.
Figure 7A:
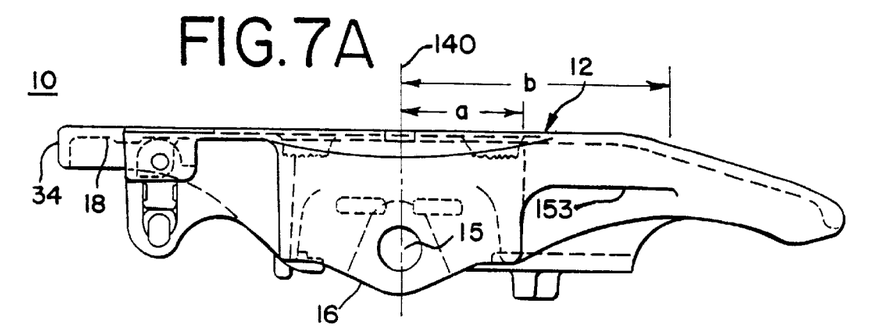

Reinforcing ribs 150 and 151 support outer plate-perimeter 158 against deflection and deformation at vertical loading between plate 12 and, ramps 62 and 64, respectively. In this structure, fifth wheel perimeter 158 at its intersections 161, 163 with ramp perimeters 160 and 162 is supported or buttressed against outward deflection of longitudinal ribs 152, 154 by reinforcing ribs 150, 151, respectively, which laterally support perimeter 158 at the site of plate deformation and inhibit undue deflection at vertical loading of plate 12. In this configuration, ribs 150 and 151 appear as an adjunct or extension to longitudinal ribs 152, 154 with a generally level lower surface 153 in FIG. 7A about parallel to the plane of plate upper surface 90. Reinforcing ribs 150, 151 blend or appear to be tangential to perimeter 158 at its intersection with transverse rib 24, and similarly blend or become tangent with ramp perimeters 160 and 162 rearward of the ramp intersection with plate 12. Initially any vertical load positioned on plate surface 90 will continue to act downward and generally induce the same deformation or deflection load on the ribs and plate. However, the outward support from reinforcing ribs 150 and 151 acts to resist the deformation from the vertical load, and to transfer the load or deformation forces along perimeters 158, 160 and 162 without deformation to ribs 152 and 154, which previously would have constituted the outer wall or perimeter of plate 12 between the plate surface 90 and ramps 62 and 64. Avoidance of deformation of ribs 152 and 154 as well as the sidewall perimeter of plate 90 is an inhibition to fatigue, cracking and other potential structural failures associated with undesirable deflection and deformation in fifth wheels 50. In FIG. 7A, plate 12 is at an unloaded and reference state with the distance from plate centerline 140 and the intersection of forward edge of one of ribs 150 and 151 indicated by letter 'a', and the backward intersection from centerline 140 of ribs 150, 151 with respective ramp perimeters 160, 162 noted by letter 'b'. As an example in a preferred embodiment, a equals 4.06 inches and b is 8.56 inches.

While only a specific embodiment of the invention has been described and shown, it is apparent that various alterations and modifications can be made therein. It is, therefore, the intention in the appended claims to cover all such modifications and alterations as may fall within the scope and spirit of the invention.

We claim:

1. A support structure mounted to a cast-steel bearing plate for a fifth wheel assembly, said bearing plate having a lower surface, an upper surface, an outer perimeter, a first planar bearing area to contact a trailer wear plate, a first longitudinal length, a forward edge and a rearward edge along said longitudinal axis, an outer perimeter, and a jaw opening generally centrally located on said bearing plate, a first trailer ramp and a second trailer ramp downwardly sloped and narrowingly tapered rearward generally along said longitudinal length from said rearward edge, each said first and second trailer ramp having an outer ramp-perimeter merging with said plate outer perimeter, a kingpin receiving groove for receipt of an engaging trailer kingpin, said groove generally defined between said first ramp and said second ramp and extending into said jaw opening along said longitudinal length, a center recess on said upper surface, a first mounting bracket and a second mounting bracket mounted on said lower surface at opposite sides of said plate outer perimeter generally along said transverse axis, each said first and second mounting bracket having a forward side and a rearward side, said support structure comprising:

a plurality of support ribs, one of said support ribs being a transverse supporting rib generally extending across said lower surface approximately between said first and second mounting bracket rearward sides to contact said plate outer perimeter in proximity to said first and second mounting brackets at a first intersection and a second intersection, respectively, a first longitudinal inner supporting rib rearwardly extending from said transverse rib at one of said first and second bracket rearward sides and merging with one said first and second ramp outer perimeters, a second longitudinal inner supporting rib rearwardly extending from said transverse rib at the other of said first and second bracket rearward sides and merging with the other of said first and second ramp outer perimeters, each said first and second longitudinal inner ribs inwardly displaced on said lower surface along said transverse rib a predetermined distance from said plate outer perimeter, a first longitudinal outer reinforcing rib generally extending rearwardly along said plate outer perimeter from one of said first and second transverse rib intersections with said plate outer perimeter, and a second longitudinal outer reinforcing rib generally extending rearwardly along said plate outer perimeter from the other of said first and second transverse rib intersections with said plate outer perimeter, said first outer reinforcing rib generally extending along said plate outer perimeter to intersect one of said first and second ramp outer perimeters at said merger of said respective one of said first and second longitudinal support ribs with one of said first and second ramp perimeters, and said second outer reinforcing rib generally extending along said plate outer perimeter to intersect the other of said first and second ramp outer perimeters at said merger of said other of said first and second longitudinal supporting ribs with the other of said first and second outer ramp perimeters, said transverse rib, said first longitudinal inner rib and the respective one of said first and second reinforcing ribs cooperating to define a first pocket at said lower surface in proximity to said plate outer perimeter and one of said first and second mounting brackets, and said second longitudinal inner rib, said transverse rib and the other of said first and second reinforcing ribs cooperating to define a second pocket at said lower surface in proximity to said plate outer perimeter and the other of said first and second mounting brackets, said reinforcing ribs providing lateral support to said plate and longitudinal ribs to inhibit lateral deflection of said plate outer perimeter at said first ramp outer perimeter and said second ramp outer perimeter against vertical loads on said plate surface.

2. A support structure for a cast-steel bearing plate of a fifth wheel assembly as claimed in claim 1 wherein said assembly at an unloaded position is at a reference position, each said first and second reinforcing rib having a rib lower surface, said first and second reinforcing rib lower surfaces approximately parallel to said plate upper surface at an assembly reference position.

3. A support structure for a cast-steel bearing plate of a fifth wheel assembly as claimed in claim 1 wherein said assembly at an unloaded position is at a reference position, each said first and second reinforcing rib having a rib outer surface, said first and second reinforcing rib outer surfaces generally concurrent with said plate outer perimeter to avoid extraneous surface perimeter protrusions of said plate.

* * * * *